US008538794B2

(12) United States Patent  
Marko et al.

(10) Patent No.: US 8,538,794 B2  
(45) Date of Patent: Sep. 17, 2013

(54) METHOD AND APPARATUS FOR MANAGEMENT OF THE CREATION OF A PATENT PORTFOLIO

(76) Inventors: Reuven A. Marko, Natanya (IL); Demetris E. Paraskevopoulos, Los Gatos, CA (US)

( * ) Notice: Subject to any disclaimer, the term of this patent is extended or adjusted under 35 U.S.C. 154(b) by 1497 days.

(21) Appl. No.: 11/934,602

(22) Filed: Nov. 2, 2007

(65) Prior Publication Data

US 2008/0313001 A1 Dec. 18, 2008

Related U.S. Application Data

(60) Provisional application No. 60/929,214, filed on Jun. 18, 2007.

(51) Int. Cl.
*G06Q 10/00* (2012.01)

(52) U.S. Cl.
USPC ........ 705/7.35; 705/400; 705/7.29; 705/7.12; 705/14.13

(58) Field of Classification Search
USPC .......................................................... 705/8
See application file for complete search history.

(56) References Cited

U.S. PATENT DOCUMENTS

| | | | |
|---|---|---|---|
| 6,038,561 A | 3/2000 | Snyder et al. | |
| 6,154,725 A | 11/2000 | Donner | |
| 6,175,824 B1 | 1/2001 | Breitzman et al. | |
| 6,263,314 B1 | 7/2001 | Donner | |
| 6,556,992 B1 | 4/2003 | Barney et al. | |
| 6,847,966 B1 | 1/2005 | Sommer et al. | |
| 6,876,930 B2 | 4/2005 | Murray et al. | |
| 6,879,990 B1 | 4/2005 | Boyer et al. | |
| 6,959,280 B1 | 10/2005 | Risen, Jr. et al. | |
| 7,089,192 B2 | 8/2006 | Bracchitta et al. | |
| 2002/0046038 A1 | 4/2002 | Prokoski | |
| 2002/0099694 A1* | 7/2002 | Diamond et al. | 707/3 |
| 2002/0178029 A1* | 11/2002 | Nutter et al. | 705/1 |
| 2004/0010393 A1 | 1/2004 | Barney | |
| 2004/0220842 A1* | 11/2004 | Barney | 705/7 |
| 2005/0010515 A1 | 1/2005 | Woltjen | |
| 2006/0036529 A1 | 2/2006 | Williams | |
| 2006/0036635 A1 | 2/2006 | Williams | |

FOREIGN PATENT DOCUMENTS

JP 2004265305 A * 9/2004

OTHER PUBLICATIONS

United States International Trade Commission. China: Effects of Intellectual Property Infringement and Indigenous Innovation Policies on the U.S. Economy. Investigation No. 332-519. USITC Publication 4226. May 2011. Retrieved online Jun. 3, 2013.*

* cited by examiner

*Primary Examiner* — James A Reagan
(74) *Attorney, Agent, or Firm* — Michael A. Glenn; Perkins Coie LLP

(57) ABSTRACT

Start-up companies, as well as new businesses within established firms, have the challenge of creating a sensible intellectual property (IP) portfolio. With resources usually tight, not all of the IP can be protected due to cost or resource availability considerations. Accordingly, disclosed herein is an apparatus and method that provide an effective solution for management of identified intellectual property. By providing an effective scoring scheme and a simple display, management decision making is made simple and straightforward, while providing in a glance the entire distribution of the firm's IP.

20 Claims, 3 Drawing Sheets

| | | IP Standing | | | | |
|---|---|---|---|---|---|---|
| | | 1 | 2 | 3 | 4 | 5 |
| Business Ranking | A | | | ABC-004 ABC-005 | | ABC-001 |
| | B | | ABC-002 ABC-007 | | ABC-003 | |
| | C | | ABC-008 | | | ABC-006 |

METHOD AND APPARATUS FOR MANAGEMENT OF THE CREATION OF A PATENT PORTFOLIO

CROSS REFERENCE TO RELATED APPLICATIONS

This application claims priority to U.S. provisional patent application Ser. No. 60/929,214, filed 18 Jun. 2007, which application is incorporated herein in its entirety by this reference thereto.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent Office patent files or records, but otherwise reserves all copyrights whatsoever.

BACKGROUND OF THE INVENTION

1. Technical Field

The invention generally relates to the field of management tools and, more specifically, to management tools for decision making with respect to intellectual property protection.

2. Description of the Prior Art

The ever growing importance of the protection of intellectual property in the form of patents is well known. It is therefore that individuals and firms spend significant resources for the purpose of actively filing and defending their intellectual property rights. In many cases, a portfolio of protected intellectual property is developed, for example in the form of patents, to protect an entity's interests.

A body of prior art has been developed for the purpose of evaluating patent portfolios and distinguishing valued issued patents from those of lesser importance. Some of the tools allow the scanning of existing databases and determining potential patents that ought to be licensed due to the importance of the patents to a business, or identifying potential licensors of certain types of protected intellectual property. Notably, the prior art concerns intellectual property which has already been filed and is to be handled in one way or another. The prior art does not address a paramount issue that individuals and firms face when in the development stage of a portfolio of protectable intellectual property. Nonetheless, this is a key area in which inventors and business managers alike expend efforts and resources to identify inventions that, when protected, provide the best return on investment.

It would be therefore advantageous to provide a management tool that would allow the easy identification of intellectual property worthy of protection. It would be further advantageous if such a tool could take into account budgetary constraints faced by the user of such a tool. It would be further advantageous if such a tool was simple to use and easily understood, without a need to spend significant time and effort in the process.

SUMMARY OF THE INVENTION

Start-up companies, as well as new businesses within established firms, have the challenge of creating a sensible intellectual property (IP) portfolio. With resources usually tight, not all of the IP can be protected due to cost or resource availability considerations. Accordingly, disclosed herein is an apparatus and method that provide an effective solution for management of identified intellectual property. By providing an effective scoring scheme and a simple display, management decision making is made simple and straightforward, while providing in a glance the entire distribution of the firm's IP.

DETAILED DESCRIPTION OF THE INVENTION

Figure 1:
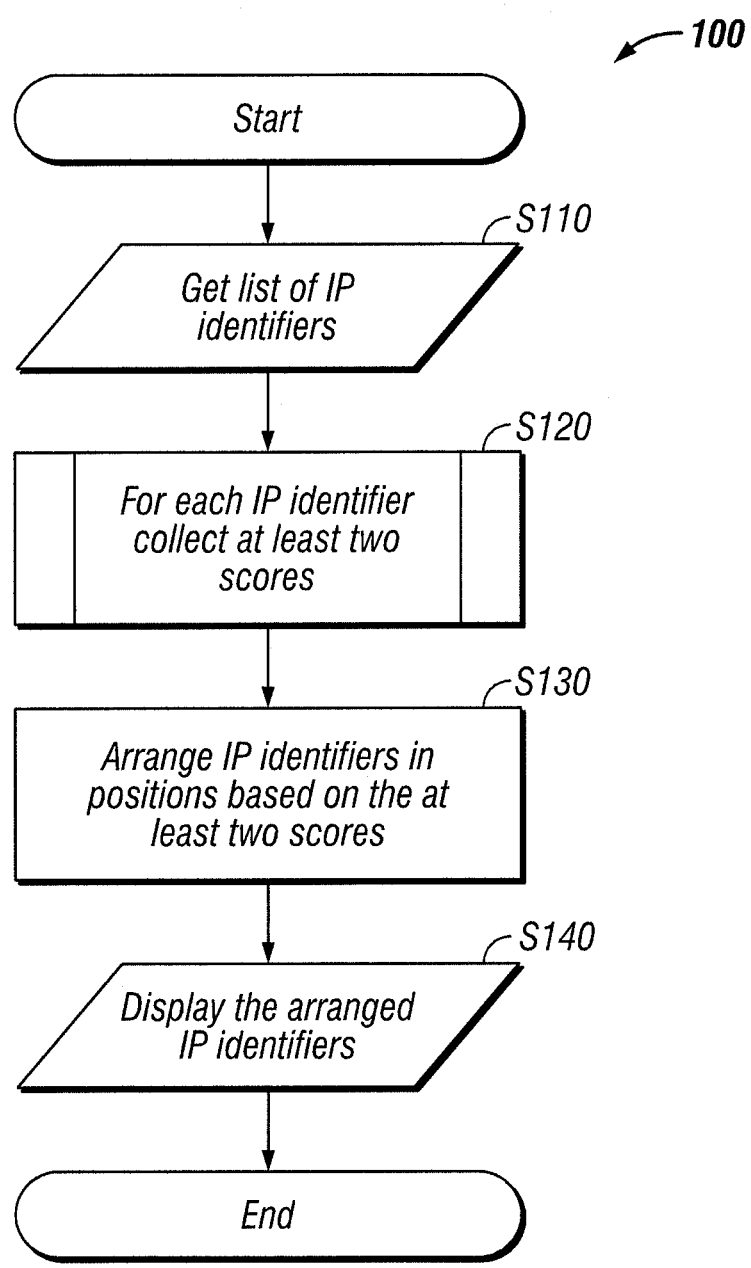
FIG. 1 is a flowchart showing scoring according to the disclosed invention.

Start-up companies, as well as new businesses within established firms, have the challenge of creating a sensible intellectual property (IP) portfolio. With resources usually tight, not all of the IP can be protected due to cost or resource availability considerations. Accordingly, an apparatus and method are disclosed that provide an effective solution for management of identified intellectual property. By providing an effective scoring scheme and a simple display, management decision making is made simple and straightforward, while providing in a glance the entire distribution of the firm's IP.

A core to the invention disclosed herein is the selection of a score system that is comprised of at least two different, preferably independent, scores. Each IP portion identified receives such scores and is then handled by the apparatus and/or the method as disclosed herein below. In one embodiment of the disclosed invention two scores may be used. The first score is a score that is respective of the intellectual property worthiness versus other IP known in the art. Such a score can be developed, for example but not by way of limitation, by searching a patent database and finding close prior art, and then assigning a lower value score if a significant amount of prior art is found for the potential portion of intellectual property.

For example, but without limitation, if a scoring system of '1' through '5' is used, then a score of '1' could mean that more than 50 pieces of relevant prior art IP were found, while a score of '5' may mean less than 10 pieces of relevant prior art IP were found. A score of '3' could mean 20-29 pieces of relevant prior art IP were found, and so on.

The second score is a score that is respective of the perceived business value of the potential portion of IP to be protected. Such a score can be developed, for example but not by way of limitation, by assessing the business value of each such IP portion, assigning a higher value score to portions of IP that increase the valuation of a firm and a lower value to portions of IP that merely increase the number of, for example, patents in the firm's portfolio. For example, but without limitation, if a scoring system of 'A' through 'C' is used, then a score of 'A' may be assigned to those portions of IP that significantly increase a firm's valuation, or that another company would purchase the firm just for the fact that it holds such portion of IP. A score of 'C' may indicate, for example, patents that have a potential value of up to twice the amount invested in protecting that IP. In one embodiment of the disclosed invention a plurality of scores are provided for each potential portion of IP considered for protection. The scores are then averaged to arrive at the respective first score or the second score. In one embodiment, a weighted average is used giving, for example, a higher weight to business persons providing a business score, and a higher weight on the IP value scores to scores provided by patent experts or technical personnel.

Reference is now made to FIG. 1 where an exemplary and non-limiting flowchart 100 describes the principles of the disclosed invention. In step S110, a list of potential portions of intellectual property is provided, each having or being assigned a unique identification. A description of a potential portion of intellectual property may include, a title, an abstract, and other information deemed appropriate. In step S120 scores, preferably independent scores, are assigned to each portion of intellectual property. The scores may be determined as defined in more detail above. In step S130 a portion of the scores are selected and arranged for display in a position based on the selected scores. In step S140 the specific arrangement, for example when two scores are used, a two dimensional matrix is displayed, each axis of the matrix corresponding to one of the scores. If three scores are used, then a cube is shown, each axis of the cube corresponding to one of the scores. In one embodiment of the disclosed invention, a plurality of displays, for example a two-dimensional matrix, are shown in sequence depending on the pairs of scores matched to the portions of identified IP. A person skilled in the art would readily understand that the display is not limited to a screen but would further include printed reports, or any other form of a tangible display of the scores.

Figures 2, 3:
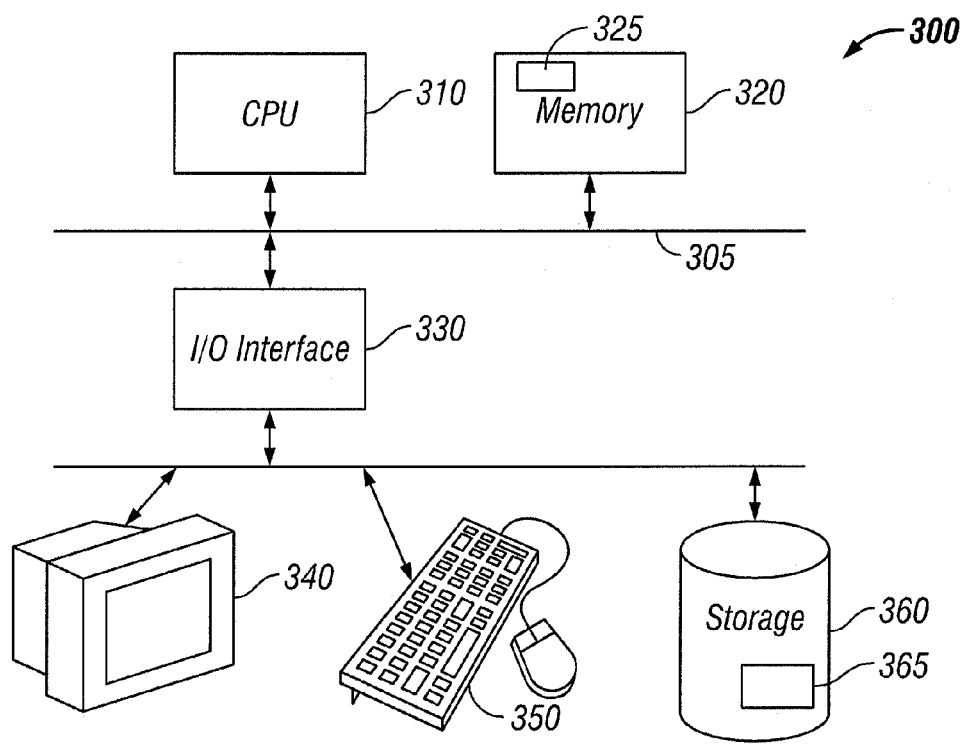
FIG. 2 is a matrix display in accordance with the disclosed invention.
FIG. 3 is a block schematic diagram showing a system that implements the disclosed invention.

Reference is now made to FIG. 2 that shows an exemplary and non-limiting two-dimensional matrix 200 created in accordance with the principles of the disclosed invention. Each of the potential portions of the IP to be protected is identified by a unique identification code, shown herein as ABC-001 through ABC-008. Each of ABC-001 through ABC-008 is assigned a first score 210 and a second score 220, the first score 210 and the second score 220 being in accordance with the example discussed in more detail above. An area 230 may be used to provide additional information as may be necessary. Decision making of, for example, which portion of IP to file for patent protection is now made easy. A diagonal (401; shown in FIGS. 4 and 5) going down from the top of the table towards the right differentiates between those portions of IP that may be protected to those which are not. In one embodiment a second diagonal (402; shown in FIG. 5) to the left of the first diagonal separates those invention that are to be filed as non-provisional patent applications and are located to the right of the first diagonal, from those that are to be filed as provisional patent application and that are between the first and second diagonal, to those where no action is to be taken.

With respect to the non-limiting example of FIG. 2 the first diagonal may pass such that ABC-001, ABC-004 and ABC-005 are determined to be filed as non-provisional patent applications. The second diagonal is placed such that the portion of IP identified as ABC-003, and now between the first diagonal and the second diagonal, is to be filed as a provisional patent application. A manager who may set aside a specific budget for filing patents in a given fiscal year can easily estimate the filing costs at this time. In the example case it would be the average cost of filing a non-provisional patent application times the number of identified portions of IP to the right of the first diagonal plus the average cost for filing a provisional patent application times the number of identified portions of IP that are between the first and second diagonal. A person skilled-in-the-art would readily notice that these should not be viewed as limiting the scope of the invention, as other criteria for each of the scores may be used.

Referring to FIG. 3, an exemplary and non limiting system 300, implemented in accordance with principles of the disclosed invention, is shown. The system comprises a central processing unit 310 coupled via a bus 305 to a memory 320 and an input/out (I/O) interface 330. The memory 320 further comprises a portion of a memory 325 that is used for the purpose of containing the display information displayed in accordance with the disclosed invention. The I/O interface 330 is coupled for example to a display 340 functioning as an output device, a keyboard 350, functioning as an input device, and a data storage 360 that is used for the purpose of holding the steps of the method executed in accordance with the disclosed invention and that cause the display of, for example, the two dimensional matrix 200. A storage portion 365 contains the IP list and the scores each of the identified potential IP to be protected received.

Figure 4:
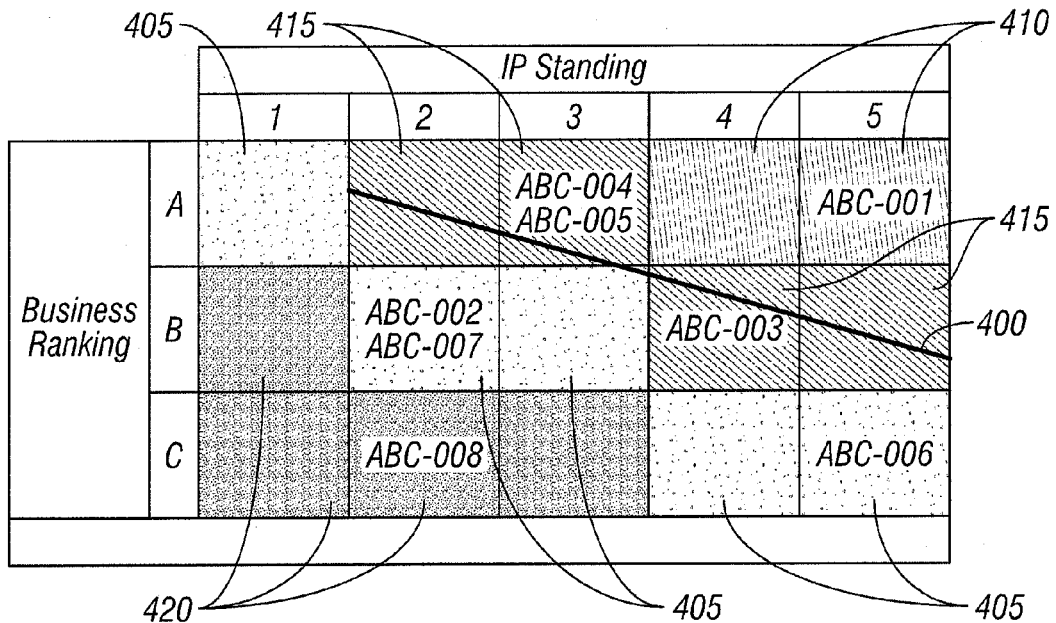
FIG. 4 shows a first ornamental design of a matrix in accordance with the invention.
Figure 5:
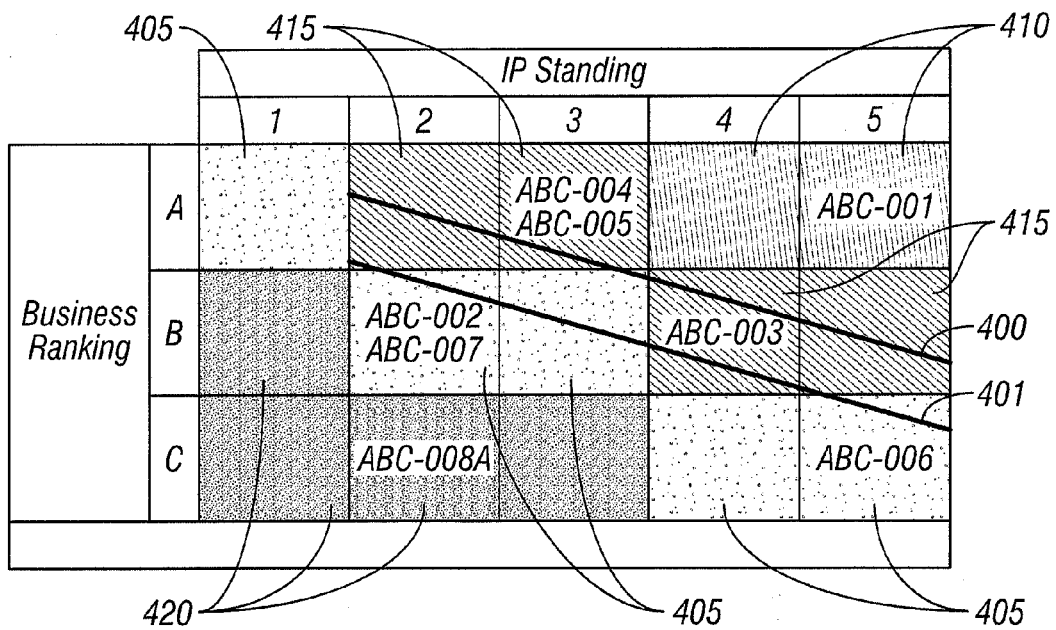
FIG. 5 shows a second ornamental design of a matrix in accordance with the invention.

With reference to FIGS. 4 and 5, there are shown examples of two-dimensional matrices that use color schemes to more easily allow the identification of the more valuable portions of intellectual property from those of lesser value. For purposes of FIGS. 4 and 5, each color is identified by a numeric designator. Hence, those portions of identified IP that reside with green cells (410) of the matrix of FIG. 4 are of a higher value than those in yellow cells (420) or red cells (430). In one embodiment, and as shown in FIG. 5, different shades of a color may be used, for example different shades of green, indicating that a deeper green (410) is a more valuable area than a lighter green (415).

The invention disclosed herein is described with respect to specific exemplary embodiments. Other embodiments are envisioned and should be considered to be part of this invention disclosure. For example, without limitation, a multi-dimensional matrix is specifically envisioned to be part of the disclosed invention, where additional scores are used to characterize the potential portion of IP to be protected. It should be further noted that the inventions herein may be implemented in hardware, software, firmware, or any combination thereof. The display of the matrix or matrices may be provided in a plurality of tangible display forms.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for management of patent development investments, comprising the steps of:
   receiving as an input, a list of portions of intellectual property for potential protection as patents;
   assigning a unique identification to each of said portions of intellectual property;
   receiving a first score respective of a first property to each of said portions of intellectual property;
   receiving a second score respective of a second property to each of said portions of intellectual property, said first score and said second being essentially independent scores; and
   displaying each said unique identification in a cell of a matrix having a first axis in a first direction and a second axis in a second direction, wherein the location of the cell within the displayed matrix in said first direction corresponds to said first score and the location of the cell within the displayed matrix in said second direction corresponds to said second score, such that said unique identification is displayed at an intersection of said first score value and said second score value;
receiving a budget figure; and
identifying the portions of intellectual property to be filed based on the location of said portions of intellectual property within said matrix moving diagonally on the matrix from the highest first score and highest second score to the lowest first score and lowest second score until the budget figure is fully consumed;
wherein consumption of the budget figured is based upon:
receiving cost figures respective of the filing of intellectual property.

2. The method of claim 1, wherein said first property is a score relative to the perceived strength of the respective portion of intellectual property.

3. The method of claim 1, wherein said first property is a score relative to the amount of prior art found with respect to the respective portion of intellectual property.

4. The method of claim 1, wherein said second property is a score relative to the perceived business value of the respective portion of intellectual property.

5. The method of claim 1, said steps of receiving a first score and said receiving a second score further comprising the steps of:
receiving a plurality of respective scores for each of said first score and said second score respectively, said plurality of respective scores having a respective said first property or a respective said second property;
calculating one of an average and a weighted average of at least one of said first score and said second score.

6. The method of claim 1, further comprising the step of:
coloring the cells of said matrix in colors that readily identify to a viewer the importance level of filing of respective portions of said intellectual property.

7. The method of claim 6, wherein coloring the cells of said matrix comprises:
coloring for display the cells of high importance in green;
coloring for display the cells of low importance in red;
coloring for display any cells not colored in green or in red in yellow.

8. The method of claim 1, further comprising the steps of:
displaying said budget figure as a constraint overlay in a form of a diagonal line over said matrix.

9. The method of claim 8, wherein a first budget constraint identifies the portions of intellectual property that are to be the subject of non-provisional patent applications.

10. The method of claim 9, wherein a second budget constraint identifies the portions of intellectual property that are to be the subject of provisional patent applications.

11. An apparatus, comprising:
input interface for a user to enter: a) a list of portions of intellectual property for potential protection, each portion of intellectual property identified by a unique identification; b) at least a first score respective of a first property for each of said portions of intellectual property; c) a second score respective of a second property for each of said portions of intellectual property said second score being essentially independent of said first score; and d) at least financial information respective of filing of said portions of intellectual property;
a memory comprising at least a plurality of cells organized as a two-dimensional matrix, a first dimension of the matrix corresponding to values of said first score and a second dimension of the matrix corresponding to values said second score;
a processing unit that under instructions stored in the memory places said unique identification into a cell of said matrix at a location corresponding to an intersection pointed to by a value of said first score in said first dimension of the matrix and a value of said second score in said second dimension of the matrix; and
a display enabled to visually show the matrix to a user of said apparatus.

12. The apparatus of claim 11, wherein said first property is a score relative to the perceived strength of the respective portion of intellectual property.

13. The apparatus of claim 11, wherein said property is a score relative to the amount of prior found with respect to the respective portion of intellectual property.

14. The apparatus of claim 11, wherein said second property is a score relative to the perceived business value of the respective portion of intellectual property.

15. The apparatus of claim 11, wherein said processing unit further calculates at least one of said first score and said second score as one of an average or weighted average of a plurality of respective scores having a first property or having a second property provided for a portion of said intellectual property.

16. The apparatus of claim 11, wherein said financial information is at least one of budget and filing costs.

17. The apparatus of claim 11, wherein said processor is enabled to add color to the cells of said matrix to effect display of said matrix in colors that readily identify to a viewer the importance level of filing for respective portions of said intellectual property.

18. The apparatus of claim 17, wherein the cells of higher importance are colored in green, the cells of lesser importance are colored in red, and any cells in between the cells colored in green and the cells colored in red are colored in yellow.

19. The apparatus of claim 11, wherein said input interface is adapted to further
display said financial information as a diagonal line on said matrix.

20. The apparatus of claim 19, wherein said processing unit further
determines at least one of the number of non-provisional patent applications and the number of provisional patent applications, based on said budget constraint.

\* \* \* \* \*